Jan. 1, 1924 1,479,084
J. NEYRET
INTERNAL COMBUSTION ENGINE FOR BICYCLES
Filed March 16, 1921  2 Sheets-Sheet 1
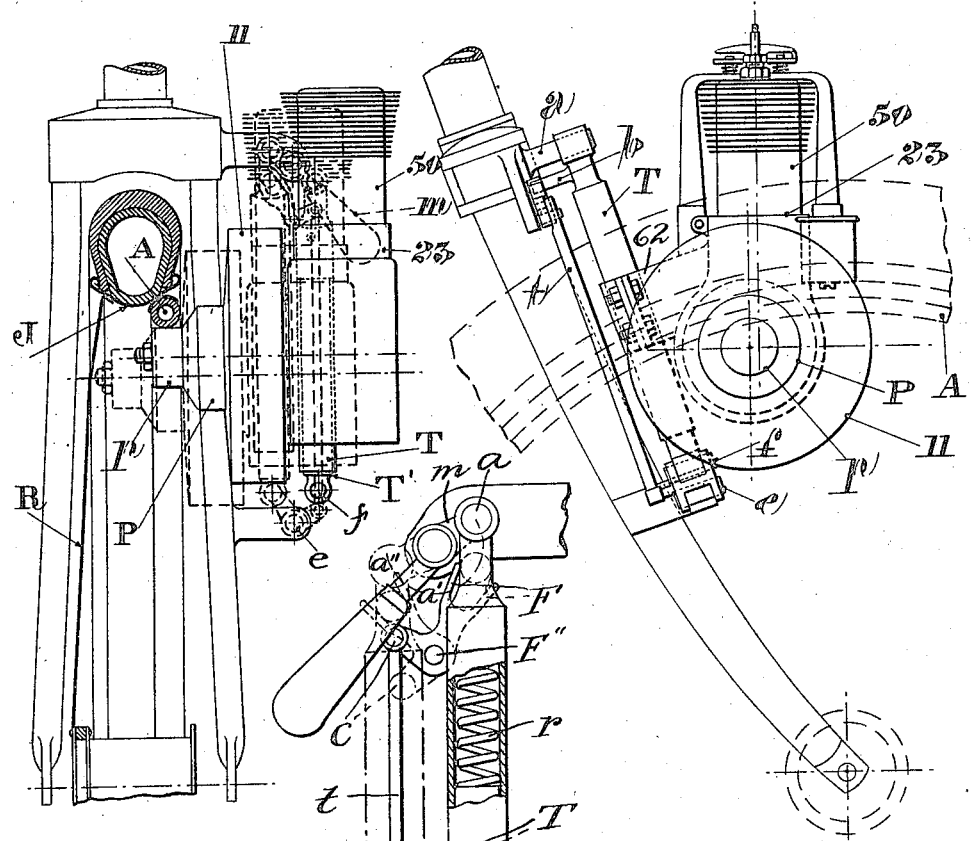
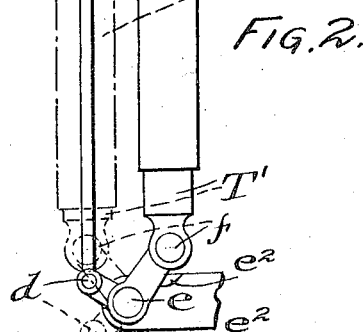
Inventor
Joseph Neyret
By B. Ginger, Atty.

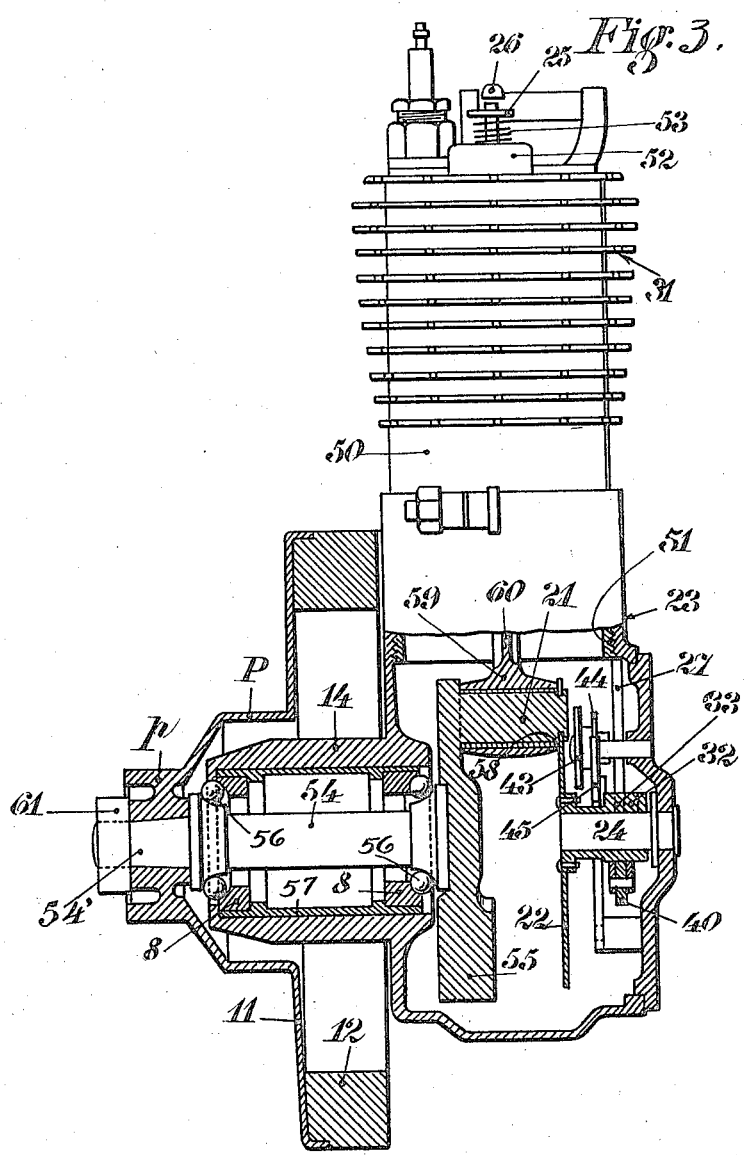

Patented Jan. 1, 1924.

1,479,084

UNITED STATES PATENT OFFICE.

JOSEPH NEYRET, OF LYON, FRANCE.

INTERNAL-COMBUSTION ENGINE FOR BICYCLES.

Application filed March 16, 1921. Serial No. 452,785.

(GRANTED UNDER THE PROVISIONS OF THE ACT OF MARCH 3, 1921, 41 STAT. L., 1313.)

*To all whom it may concern:*

Be it known that I, JOSEPH NEYRET, a citizen of the French Republic, residing at Lyon, France, have invented certain new and useful Improvements in Internal-Combustion Engines for Bicycles (for which I filed an application in France March 3, 1920, issued April 21, 1921, Patent No. 523,464), of which the following is a specification.

This invention relates to improvements in motors for propelling bicycles and the like.

It consists in mounting the engine on a tube which can be moved to bring one or the other of two driving pulleys into engagement with the rim of the wheel or to move the pulleys out of engagement therewith.

The invention will be described with reference to the accompanying drawings, in which:—

Fig. 1 is a front view, partly in section, of a bicycle frame showing the mounting of the motor.

Fig. 1$^a$ is a side view of the same.

Fig. 2 is a view of the tube on which the engine is mounted.

Fig. 3 is a side view of the engine partly in section.

The engine cylinder 50 is screwed into the crank case 23 by means of the thread 51. This arrangement allows the compression to be varied by unscrewing or screwing up the cylinder thus moving it up or down. The cylinder has grooves 31 in the fins, the grooves being arranged radially to assure the circulation of air for cooling the cylinder. The seats 52 of the valve 25 are sunk into the cylinder itself, the valves being closed by the springs 53. As the valves are light and of small diameter they will be prevented from overheating by conduction from the exhaust.

The crank 21 of the engine is balanced by a weight 55 permitting the use of ball bearings 56 in races 8. The bearings 56 are mounted inside a tube 57 carried in the casing 14 formed in one with the crank case 23.

On the crank 21 is mounted the bearing 59 of the piston rod 60 held in position by a forked plate 22 which enters a groove 58 in the wrist of the crank. The plate 22 is mounted on the cam shaft 24.

The revolving casing 11 is mounted on the conical end 54' of the shaft 54 secured by the nut 61. This casing 11 of non-magnetic metal, forms the two pulleys P, $p$, and also the casing of the revolving magnet 12. The casing 11 and the magnet 12 act as the fly wheel of the engine with the consequent reduction in weight of the engine as a separate magneto is unnecessary. An extension 62 on the crank case is provided with an opening to receive the tube T (Fig. 2) by the movement of which the motor can be displaced to engage either of the gears or to allow the engine to run free.

The engine is mounted on the frame by means of the tube T inside which is a tube or rod T', the two tubes tending to separate owing to the spring $r$. The tube T at its upper end is mounted on a shaft $a$ on which is also mounted the gear change lever $m$ pivoted at $b$. The shaft $a$ can travel through an arc $a$, $a'$, $a^2$. In the position $a$ the small pulley $p$ is in contact with the ring A, which is affixed to the rim J of the front wheel of the bicycle R. This ring A is circular in section and is made of rubber, leather or the like and may be either solid or tubular, but preferably tubular, so that it may be inflated with air to the desired pressure.

In the position $a'$, the pulleys P, $p$ are running free. In the position $a^2$ the pulley P is in contact with the ring A and the machine is in top gear.

In order that the pulleys P, $p$, may engage the rim A the wheel R must not have any spokes, the rim J being mounted on a single disc R.

To guide the movement of the shaft $a$ in gear changing the said shaft works in a fork F pivoted at F'' on the frame of the bicycle. The other end of the fork F is jointed at $c$ to the rod $t$, the latter being jointed at its lower end to a lever $d$ pivoted at $e$, the end $f$ being jointed to the lower end of the tube or rod T'. The result of this arrangement is that the tube T remains parallel to its initial position during any gear change. Stops $e^2$ are arranged in the two extreme positions against which the two arms of the lever $e$ abut. The spring $r$ takes up any play and keeps the tube T in constant contact with shaft $a$ causing constant contact of the pulley with the ring A.

The shafts F'', b, turn in bearings affixed to the steering column of the bicycle and to the wheel fork respectively, so that the engine turns with the movement of the front wheel R.

It can be seen that an engine constructed as described, and using the heavy portion of the fly wheel for the magnetic yoke of the magneto, can be made considerably lighter than one not so constructed, and yet be equally powerful. The total weight may be very small for a given power on account of its high speed of rotation. It will therefore be only an insignificant extra weight on a bicycle, yet its power is sufficient to drive a bicycle at from 25 to 30 kilometres an hour on the level. Obviously this engine is not limited to drive bicycles but can be used anywhere where a light engine is required, in which case suitable means of transmission can be substituted for the ring A.

What I claim is:—

An internal combustion engine for propelling bicycles, having a crank shaft, a revolving casing mounted on the crank shaft, said casing being staggered so as to form two pulleys, a crank case having an extension provided with an opening, a tube movable in said opening and by the movement of which the motor can be displaced to engage either of the pulleys, or to allow the engine to run free, means for connecting the tube to the frame of a bicycle, a second tube inside the first named tube, a spring tending to separate the tubes, a shaft at the upper end of the outer tube, a gear change lever pivoted at the shaft, a guide for said shaft pivoted on the frame of the bicycle, means for connecting said guide to the lower end of the inner tube, bearings for the shafts affixed to the steering column of the bicycle and to the wheel fork respectively so that the engine turns with the movement of the front wheel of the bicycle, and a ring affixed to the rim of the front wheel to be engaged by either of the pulleys of the motor.

In witness whereof I affix my signature.

JOSEPH NEYRET.

Witnesses:
JEAN GERMAIN,
JULIAN KEMBLE SMEDHERZ.